(12) United States Patent
Pan et al.

(10) Patent No.: US 6,308,079 B1
(45) Date of Patent: Oct. 23, 2001

(54) METHOD AND APPARATUS FOR A TALKGROUP CALL IN A WIRELESS COMMUNICATION SYSTEM

(75) Inventors: Shaowei Pan, Lake Zurich; Rich Comroe, South Barrington; Bruce A. Oltman, Schaumburg; Shmuel Silverman, Buffalo Grove; Mark O'Beirne, Lake Barrington, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/534,384

(22) Filed: Mar. 24, 2000

(51) Int. Cl.[7] ................. H04B 7/00; H04Q 7/20
(52) U.S. Cl. .............. 455/519; 455/518; 455/416; 455/520
(58) Field of Search ................. 455/518, 519, 455/520, 524, 512, 517, 514, 416; 370/266, 342, 335

(56) References Cited

U.S. PATENT DOCUMENTS 5,506,837 * 4/1996 Sollner ........................... 370/296
5,881,368   3/1999 Grob et al. ...................... 455/69
5,914,958   6/1999 Chinitz et al. .................. 370/441
5,930,723 * 7/1999 Heiskari ........................... 455/518
5,970,417 * 10/1999 Toyryla .......................... 455/519
5,983,099  11/1999 Yao et al. ....................... 455/426
6,005,848  12/1999 Grube et al. .................... 370/266
6,026,295 * 2/2000 Okada ............................ 455/416

* cited by examiner

Primary Examiner—Vivian Chang
Assistant Examiner—John J Lee
(74) Attorney, Agent, or Firm—Kenneth A. Haas

(57) ABSTRACT

In a wireless code-division multiple access (CDMA) system (100), a talkgroup (101) of subscriber units is provided. A sub-talkgroup (102) of subscriber units, forming a part of the talkgroup is assigned at least one inbound channel (416–417). The talkgroup is assigned outbound channels (415). Members of the sub-talkgroup may simultaneously transmit voice information (410–411) using the at least one inbound channel, which voice information is summed (412) and re-transmitted to the talkgroup using the outbound channels. Voice information is summed so that an individual talker receives summed voice information without the individual subscriber's voice content. Subscriber units in the sub-listengroup are allowed to transmit voice information only after requesting, and receiving, an additional inbound channel.

12 Claims, 7 Drawing Sheets

| TALKGROUP | TG UNITS | DUPLEX SUBGROUP UNITS |
|---|---|---|
| TG 001 | SU 001<br>SU 002<br>SU 003<br>SU 004<br>SU 008<br>SU 009 | SU 003, SU 008<br>SU001<br>SU 001, SU 008<br>SU001<br>SU 003, SU 003<br>SU 001 |
| TG 001<br>⋮ | ⋮ | ⋮ |

*FIG. 3*

METHOD AND APPARATUS FOR A TALKGROUP CALL IN A WIRELESS COMMUNICATION SYSTEM

CROSS REFERENCE TO RELATED CO-PENDING APPLICATIONS

This application is a related application to a co-pending application entitled "METHOD AND A PPARATUS FOR TALKGROUP CALL IN A WIRELESS COMMUNICATION SYSTEM", Ser. No. 09/535,924, filed on even date, owned by instant assignee.

FIELD OF THE INVENTION

The present invention relates generally to wireless code-division multiple access systems and, in particular, to a method and apparatus for talkgroup calls within such systems.

BACKGROUND OF THE INVENTION

Two-way wireless communication systems incorporating group dispatch services are known in the art. Group dispatch services typically provide communications within a talkgroup. A talkgroup is a set of logically united subscriber units (e.g., in-vehicle mobile and/or hand-held portable radios) capable of engaging in group-wide communications. In normal talkgroup communications, a single subscriber unit of the talkgroup transmits voice information that is received by a fixed infrastructure and re-transmitted to the other subscriber units in the talkgroup. Typically, such systems use frequency-division multiple access (FDMA) and/or time-division multiple access (TDMA) methods to receive and broadcast the transmission. In FDMA systems, an inbound channel is normally paired with an outbound channel, and the inbound channel can be used by only one subscriber unit at a time. Similarly, in TDMA systems, inbound and outbound time slots are paired and only one subscriber unit at a time can transmit an inbound message for re-transmission.

While these systems provide useful group communications, they force communications to be somewhat regimented in that only one subscriber "owns" the call at any time. That is, more natural group-style communications in which there are simultaneous multiple speakers and multiple listeners are not possible because only one subscriber unit can be transmitting at any time. Although numerous prioritization methods exist today to allow high priority users, or users originating high priority traffic (i.e., emergency calls), to be declared the owner of a talkgroup call, communications are still restricted to single speaker/multiple listener configurations.

Current telephone services provide for conference calls in which multiple speakers and multiple listeners may simultaneously participate in the call. Conference calling can be extended to current wireless systems by allocating a separate inbound channel or time slot to each potential speaker and a separate outbound channel or time slot for potential listeners. Further still, separate full duplex channels (inbound and outbound resources) could be allocated to each subscriber unit of the talkgroup. While these approaches are functional, they are highly inefficient in terms of resource usage. For example, it is not uncommon in public safety organizations to have talkgroups encompassing up to 100 subscriber units. Obviously, establishing a group conference call using separate inbound and/or outbound resources for up to 100 separate subscriber units would require communication resources beyond the capacity of most communication systems.

One solution to the above-mentioned problem is provided by Grube et al. in U.S. Pat. No. 6,005,848, entitled METHOD AND APPARATUS FOR A TALKGROUP CALL IN A WIRELESS CDMA SYSTEM, assigned to the assignee of the present invention and incorporated by reference herein. As described by Grube et al., a sub-talkgroup of the talkgroup is assigned at least one inbound code, with the entire talkgroup assigned an outbound code. Members of the sub-talkgroup can simultaneously transmit voice information using the inbound code(s). The voice information of the talkers is summed and broadcast to all users of the talkgroup. While the above-mentioned technique does provide for a more natural conversation between users, a drawback to the approach is that those individuals that are actively talking, have their voice broadcast to them, which can be annoying to the talker.

Thus, a need exists for duplex communications between members of a talkgroup in wireless communication systems that allows multiple users to simultaneously broadcast to the talkgroup, yet does not allow an active talker to hear their voice broadcast.

BRIEF DESCRIPTION OF THE DRAWINGS

FIG. 3 illustrates a table for that may be incorporated when establishing a talkgroup call in accordance with the present invention.

DESCRIPTION OF A PREFERRED EMBODIMENT

The present invention generally provides for duplex communications within talkgroups where a talker's voice is not broadcast to the talker. A sub-talkgroup of subscriber units, forming a part of the talkgroup, is assigned at least one inbound code. The talkgroup is assigned outbound codes. Members of the sub-talkgroup may simultaneously transmit voice information using the at least one inbound code, which voice information is summed and re-transmitted to the talkgroup using the outbound codes. Voice information is summed so that an individual talker receives summed voice information without the individual subscriber's voice content. Subscriber units in the talkgroup, but not included in the sub-talkgroup, (sub-listengroup), are allowed to transmit voice information only after requesting, and receiving, an additional inbound code.

The present invention encompasses a method for the fixed infrastructure to establish a talkgroup call. The method comprises steps of receiving, from a first subscriber unit of the plurality of subscriber units, a request for the talkgroup call, the request comprising an identity of the first subscriber unit and an identity of a talkgroup, identifying, based on the identity of the talkgroup, a talkgroup of subscriber units comprising at least two subscriber units of the plurality of subscriber units, identifying, based on the identity of the first subscriber unit, a sub-talkgroup of subscriber units of the talkgroup, and assigning an outbound time slot in a frequency channel to subscribers in the sub-listengroup. In the preferred embodiment of the present invention a plurality of outbound time slots in the frequency channel are assigned in a one-to-one manner to subscribers in the sub-talkgroup if there is more than one talker and at least one inbound time slot in the frequency channel is assigned in a one-to-one manner to the sub-talkgroup.

The present invention additionally encompasses a method for the fixed infrastructure to establish a talkgroup call. The method comprises steps of receiving inbound voice data from a plurality of subscriber units within a talkgroup, the inbound voice data comprising voice data from a first subscriber. The inbound voice data is summed to produce summed voice data. Finally the summed voice data is transmitted to subscribers within the talkgroup without transmitting the summed voice data to the first subscriber.

The present invention additionally encompasses a method comprising steps of receiving inbound voice data from a plurality of subscriber units within a talkgroup, the inbound voice data comprising voice data from a first subscriber, transmitting first summed voice data to subscribers in the sub-listengroup, wherein the first summed voice data comprises a summation of a plurality of subscriber units that are actively transmitting inbound voice, and ceasing transmission of voice data to subscribers in the sub-talkgroup.

Figure 1:
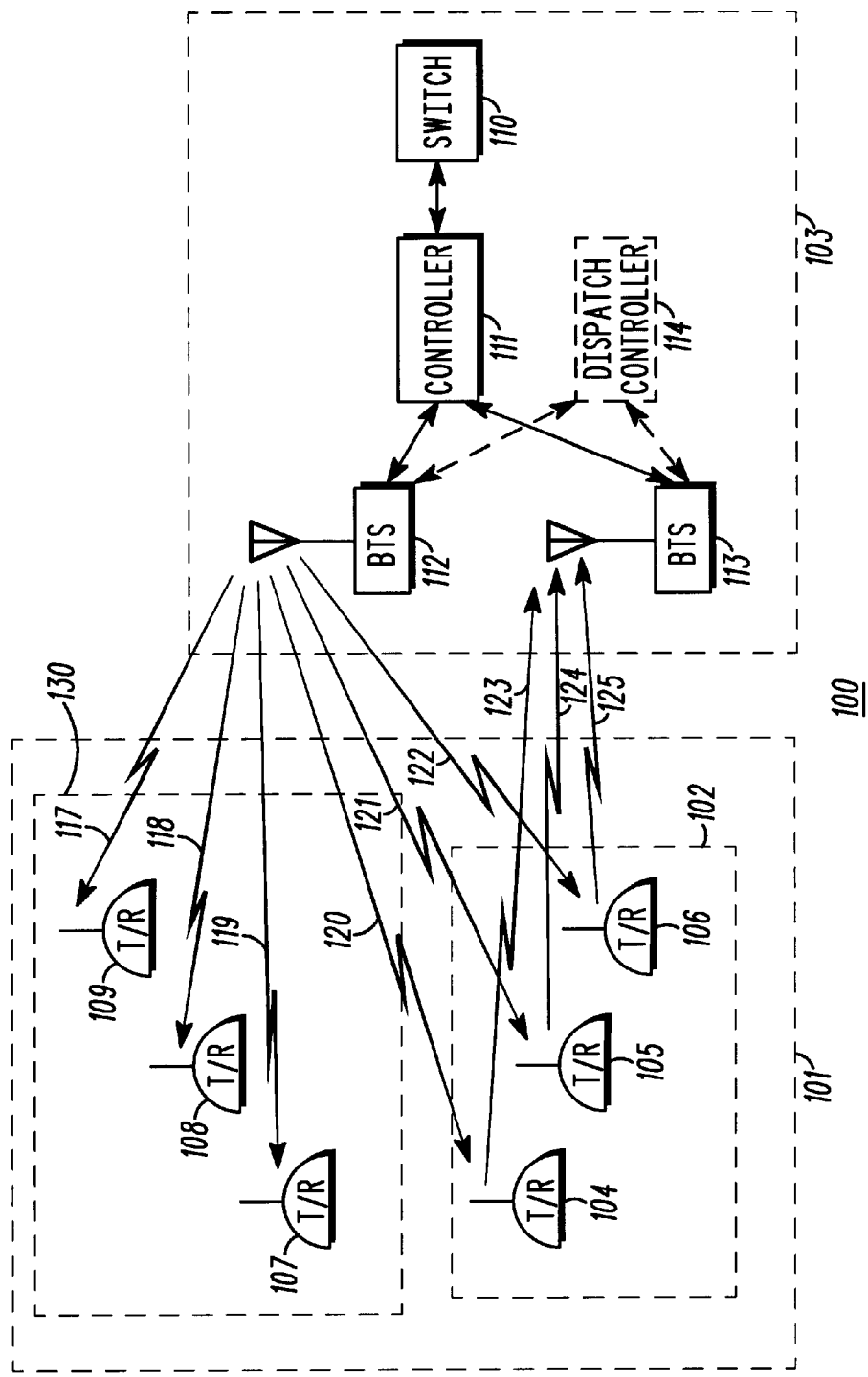
FIG. 1 is a block diagram of a wireless communication system in accordance with the present invention.

The present invention can be more fully described with reference to FIGS. 1–5. FIG. 1 is a block diagram of a wireless communication system 100 in accordance with the present invention. In the preferred embodiment of the present invention, communication system 100 utilizes a next generation CDMA architecture as described in the cdma2000 International Telecommunication Union-Radio communication (ITU-R) Radio Transmission Technology (RTT) Candidate Submission document, but in alternate embodiments communication system 100 may utilize other analog or digital cellular communication system protocols such as, but not limited to, the next generation Global System for Mobile Communications (GSM) protocol, or the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008).

Wireless communication system 100 comprises a plurality of subscriber units 104–109 arranged into at least one talkgroup 101 in wireless communication with a fixed infrastructure 103. Talkgroup 101 further comprises a sub-talkgroup 102 and a sub-listengroup 130. In the example shown, the subscriber units identified by reference numerals 104–106 are included in talkgroup 101 and sub-talkgroup 102, whereas the subscriber units identified by reference numerals 107–109 are included in the sub-listengroup. In the preferred embodiment, each of subscriber units 104–109 is physically capable of duplex communications. However, as described in further detail below, only those subscriber units included in the sub-talkgroup are logically allowed to engage in duplex communications relative to talkgroup 101.

As known in CDMA systems, communication channels 117–125 are effectively provided through the use of spreading codes. As described in further detail below, outbound codes are used to effectively provide outbound communication channels 117–122 to each subscriber unit in talkgroup 101. Additionally, inbound codes (three used in the example illustrated in FIG. 1) are used to effectively provide inbound communication channels 123–125 to each subscriber unit in sub-talkgroup 102.

Fixed infrastructure 103 comprises those elements normally required to support communications within wireless system 100 and, in the preferred embodiment, conforms to a packet-based CDMA architecture. In particular, fixed infrastructure 103 comprises a switch 110 in communication with a controller 111 that, in turn, is in communication with base transceiver systems (BTSs) 112–113. Switch 110 (often referred to as a Mobile Switching Center or MSC), controller (often referred to as a Base Station Controller or BSC) 111 and BTSs 112–113 are all well known in the art. In practice, switch 110 typically communicates with more than one controller, and may communicate with other equipment not shown. For the purposes of simplicity, fixed infrastructure 103 has been limited as shown in FIG. 1. Fixed infrastructure 103 may also optionally include a dispatch controller 114 in communication with BTSs 112–113. A suitable dispatch controller 114 is the Dispatch Application Processor used in "iDEN" wireless communication systems manufactured by Motorola, Inc. The management of group call processing is preferably handled by controller 111 or, if used, by dispatch controller 114. Additionally, the functionality of group call handling, as described below, may be distributed throughout fixed infrastructure 103.

Figure 2:
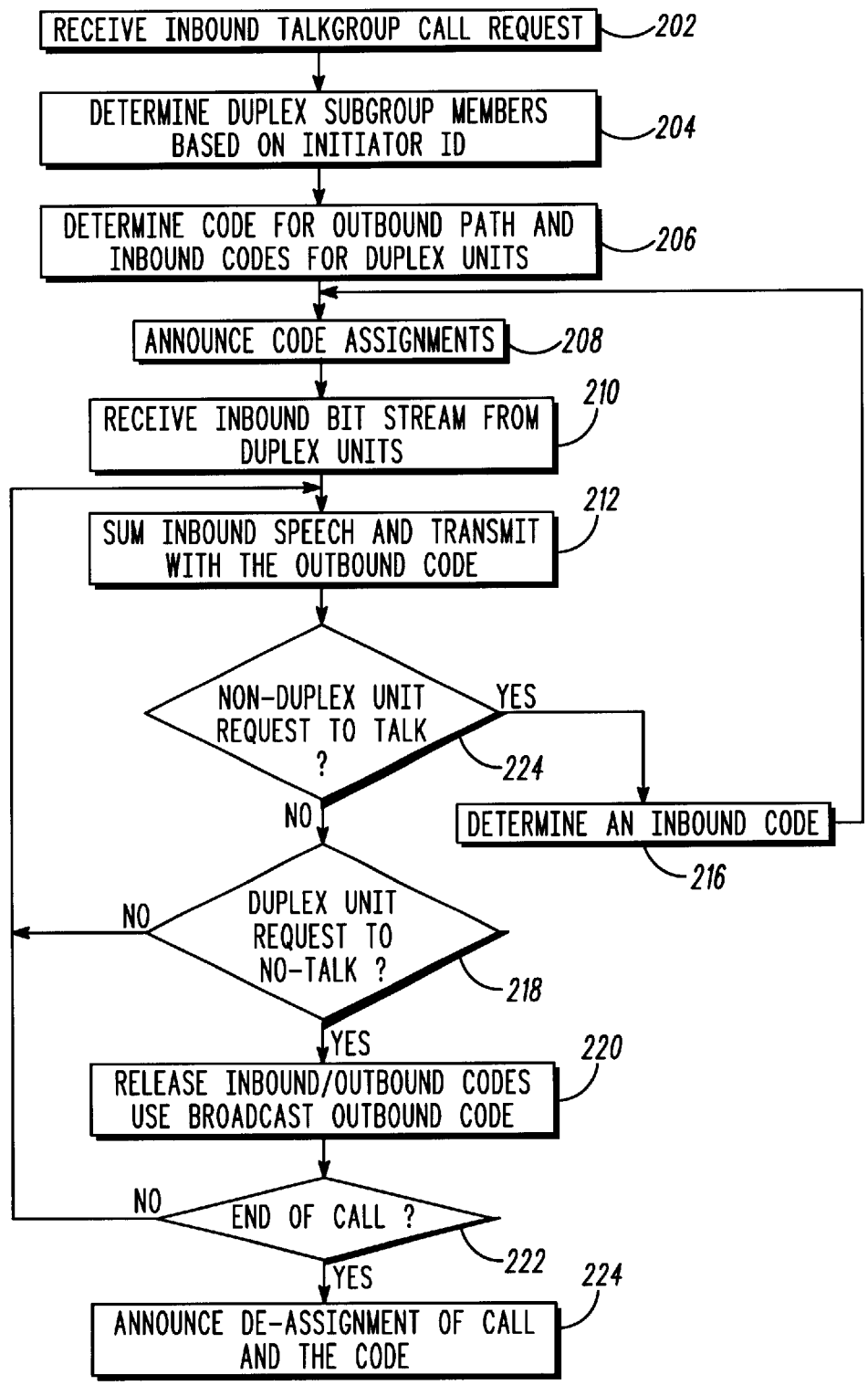
FIG. 2 is a flow chart illustrating a method for use by a fixed infrastructure in accordance with the present invention.

FIG. 2 is flow chart illustrating a method for use by fixed infrastructure 103. Although the method described in FIG. 2 is generally implemented by fixed infrastructure 103, the method is preferably carried out by controller 111 or by dispatch processor 114, if used. Also, the functionality illustrated in FIG. 2 may be distributed throughout fixed infrastructure 103. Generally, the method illustrated in FIG. 2 is implemented as stored software routines that are executed by the platforms in which the software is stored.

At step 202, fixed infrastructure 103 receives a request for a talkgroup call from a subscriber unit of talkgroup 101. The requesting subscriber unit may be one of subscriber units 104–106 included in sub-talkgroup 102, or it may be one of subscriber units 107–109 that is not a member of sub-talkgroup 102. Regardless, the request includes an identification of the requesting subscriber unit and an identification of the talkgroup for which communications are to be established. At step 204, fixed infrastructure 103 determines, using a table and the identifications of the talkgroup and the requesting subscriber unit, which subscriber units within talkgroup 101 are to be established as duplex participants of the talkgroup call, i.e., those subscriber units included in sub-talkgroup 102. The table used to this end is further described relative to FIG. 3.

FIG. 3 illustrates a table 300 that may be used by fixed infrastructure 103 when establishing a talkgroup call. Table 300 comprises a series of entries 301–303 that correlate identifications of talkgroups 301 with the identifications of requesting subscriber units 302 and the sub-talkgroups corresponding to each requesting subscriber unit 303. One benefit of this structure is that by changing the entries in the table 300, various configurations of sub-talkgroups may be provided on a dynamic basis. Referring to the example shown in FIG. 3, the talkgroup identified as TG 001 includes subscriber units identified as SU 001, SU 002, SU 003, SU 004, SU 008, and SU 009. Thus, when subscriber unit SU 003 requests a talkgroup call, subscriber units SU 001, SU 002, SU 003, SU 004, SU 008, and SU 009 are included in the talkgroup, and subscriber units SU 001 and SU 008 are established as duplex sub-talkgroup members. Alternatively, when any of subscriber units SU 002, SU 004, or SU 009 requests a talkgroup call, subscriber units SU 001, SU 002, SU 003, SU 004, SU 008, and SU 009 are included in the talkgroup, and only subscriber unit SU 001 is established as a duplex sub-talkgroup member.

The data entered into duplex sub-talkgroup entries 303 can be entered by a system manager, or it can be automatically entered as a dynamic function of various events. One manner of carrying out dynamic updates of subgroup entries 303 is to continuously store identities of subscriber units that have recently engaged in communications with the requesting subscriber unit. That is, when one-to-one communications with a given unit are established, the sub-talkgroup entries can be updated to include the identity or identities of those subscriber units that participated in such one-to-one communications. Alternatively, any subscriber units that request to be added to a talkgroup call initiated by the requesting unit (described in further detail below) can be added to the appropriate sub-talkgroup entry. The time window for such "recent" communications is a matter of design choice and may be based on absolute time (e.g., only subscriber units that have communicated in the last X minutes) or sequence (e.g., only the last X subscriber units that have communicated). Another method is to update the sub-talkgroup entries 303 based on the relative priorities of subscriber units within the talkgroup. Thus, for any given subscriber unit, the sub-talkgroup only comprises those subscriber units within the talkgroup having a priority at least as high as the given unit. As priorities for subscriber units change, sub-talkgroup entries 303 may be correspondingly updated. Yet another method is to update sub-talkgroup entries 303 based on locations of subscriber units relative to each other. Thus, as a given subscriber unit updates its current location, the sub-talkgroup corresponding to that subscriber unit is updated to include only those subscriber units within a predetermined distance (e.g., one mile) of the given subscriber unit. Of course, other methods may be readily apparent to those having ordinary skill in the art. Additionally, other embodiments that achieve the same result as table 300 may also used.

A subscriber can dynamically switch between the sub-talkgroup and sub-listengroup. If a subscriber requires to become part of the sub-listengroup, a new inbound and outbound channel are assigned to this subscriber. The subscriber then switches from the sub-listengroup to the sub-talkgroup. In order to save the RF resource, if a subscriber who is in the sub-talkgroup requires listening only, the inbound and outbound channels of this subscriber are released and the outbound channel in the sub-listengroup is assigned to the subscriber. The subscriber then switches from the sub-talkgroup to the sub-listengroup.

Returning to FIG. 2, having determined sub-listengroup 130 and sub-talkgroup 102, fixed infrastructure 103 assigns a plurality of outbound and inbound codes to the sub-listengroup and sub-talkgroup, respectively. In the preferred embodiment of the present invention those users in sub-listengroup 130 are assigned a single multicast outbound channel. However, those users in sub-talkgroup 102 are each assigned a unique channel for outbound transmission. If there is only one subscriber/talker in the sub-talkgroup, there is no need to assign an outbound channel to this subscriber/talker. To this end, fixed infrastructure 103, at step 206, determines a plurality of outbound codes for use with talkgroup 101 and at least one inbound code for use with sub-talkgroup 102. Fixed infrastructure 103 may determine a single inbound code that is to be used by sub-talkgroup 102 or, preferably, separate inbound codes that are assigned to each member of sub-talkgroup 102. The outbound codes are used to create outbound channels 117–122 (often referred to as a downlink or forward channel) to each subscriber unit in talkgroup 101. The at least one inbound channel is used (often referred to as an uplink or reverse channel) for the members of the sub-talkgroup 102. The outbound code and at least one inbound code are announced to talkgroup 101 at step 208. This announcement may be achieved using a control channel based on a PN code known to each subscriber unit, which control channel is monitored by the subscriber units.

In the preferred embodiment of the present invention if the maximum subscriber number in the sub-talkgroup is 1, the group call is similar with the iDEN dispatch call. This requires only one inbound channel and one outbound channel. If the maximum subscriber number in the sub-talkgroup is equal to the number in the talkgroup, the group call is similar with the full duplex conference call. This requires N inbound channels and N outbound channels, where the N is the subscriber number in the talkgroup. However, if the maximum subscriber number, M, in the sub-talkgroup is between 1 and N, the group call is identified as an M-master dispatch call. This design requires M inbound channels and M+1 outbound channels.

Having made the code assignments, only those subscriber units included in sub-talkgroup 102 may make inbound transmissions for the talkgroup call. Consequently, at step 210, dispatch controller 114 receives streams of voice information from one or more subscriber units in sub-talkgroup 102. The voice streams are passed to dispatch controller via base stations 112–113. Assuming that the at least two subscriber units within sub-talkgroup 102 were assigned unique inbound codes, the streams of voice information received by fixed infrastructure 103 may arrive concurrently, i.e., in a manner representative of normal group-style communications. Those units within sub-talkgroup 102 not currently transmitting voice will transmit an idle pattern, as known in the art. At step 212, fixed infrastructure 103 (dispatch controller 114) sums the streams of voice information to produce summed voice information. Various summing techniques may be used including, but not limited to, conference bridges or arithmetic addition within a signal processor. If the streams of voice information are in a form not suitable for summing, e.g., compressed digital voice, at least one interim transcoder, as known in the art, may be required to convert the streams of voice information into a format that is readily summed. It should be noted that when an Enhanced Variable Rate Coder (EVRC) is utilized, only two signals are combined, since an EVRC vocoder can only encode a maximum two people's voices. If more than two people's voices sum together, patch information is beyond the limitation of the EVRC vocoder. Thus, when an EVRC vocoder is utilized, only the two highest-energy voice signals are summed. In the preferred embodiment of the present invention a determination is made to where the resulting summed signal is to be transmitted, and if the resulting signal is to be transmitted to a current talker within subgroup 102, the resulting summed voice has the individual talker's voice removed from the summed signal (step 213). If the resulting signal is to be transmitted to a subscriber unit that is not currently talking, then at step 213 no voice signal is removed from the summed signal.

Regardless of the summing method used, the summed voice information is then transmitted by fixed infrastructure 103 using an outbound code. Because the outbound code is used, only the subscriber unit utilizing the particular code will be able to receive and reproduce the summed voice information. Because the summed voice information is representative of multiple speakers, more realistic group communications are achieved. Additionally, each individual user's voice is removed from their outbound signal, preventing the user's voice from being broadcast to them.

The present invention anticipates that it may be necessary for subscriber units not currently members of sub-talkgroup 102, and therefore unable to transmit voice information, to request the ability to transmit. Thus, at step 214, fixed infrastructure 103 determines whether any subscriber units in the sub-listengroup have transmitted a request to talk. The request to talk is transmitted on a channel based on a code other than one of the inbound codes assigned to sub-talkgroup 102 (i.e., a control channel). The request to talk includes identification of talkgroup 101 and an identification of the subscriber unit requesting to talk. If such a request is received, the fixed infrastructure determines an additional inbound code, preferably unique from the previously assigned inbound code(s), at step 216. The additional inbound code is then announced to the requesting unit at step 208, and the talkgroup call proceeds as before, but with the addition of the requesting unit as a speaker in the call. As described above, the table discussed with regard to FIG. 3 may be updated to include the requesting unit (i.e., the unit that was assigned the additional inbound code) in the sub-talkgroup entry used to establish the current talkgroup call. The operation of a subscriber unit complementary to steps 214 and 216 is discussed relative to FIG. 5 below.

Assuming no requests to talk have been received at step 214, fixed infrastructure 103 determines at step 218 whether a subscriber/talker in the sub-talkgroup requires listening only instead of talking. If a subscriber/talker in the sub-talkgroup requires listening only, the inbound and outbound channels of this subscriber are released and the outbound channel of the sub-listengroup is assigned to the subscriber at step 220. The subscriber is moved from the sub-talkgroup to the sub-listengroup.

Fixed infrastructure 103 then determines (step 222) whether the talkgroup call has ended. It is understood that various techniques may be employed to detect the end of the talkgroup call. For example, a time out timer may be used after all units have ceased transmitting either idle patterns or voice information. Alternatively, a detection that all subscriber units in sub-talkgroup 102 have dekeyed could be used. Regardless, assuming that the talkgroup call has ended, fixed infrastructure 103 de-assigns the outbound code and inbound codes at step 224. Similar to step 208, the de-assignment of the outbound and inbound codes can be performed over a control access channel using known PN codes.

Figure 4:
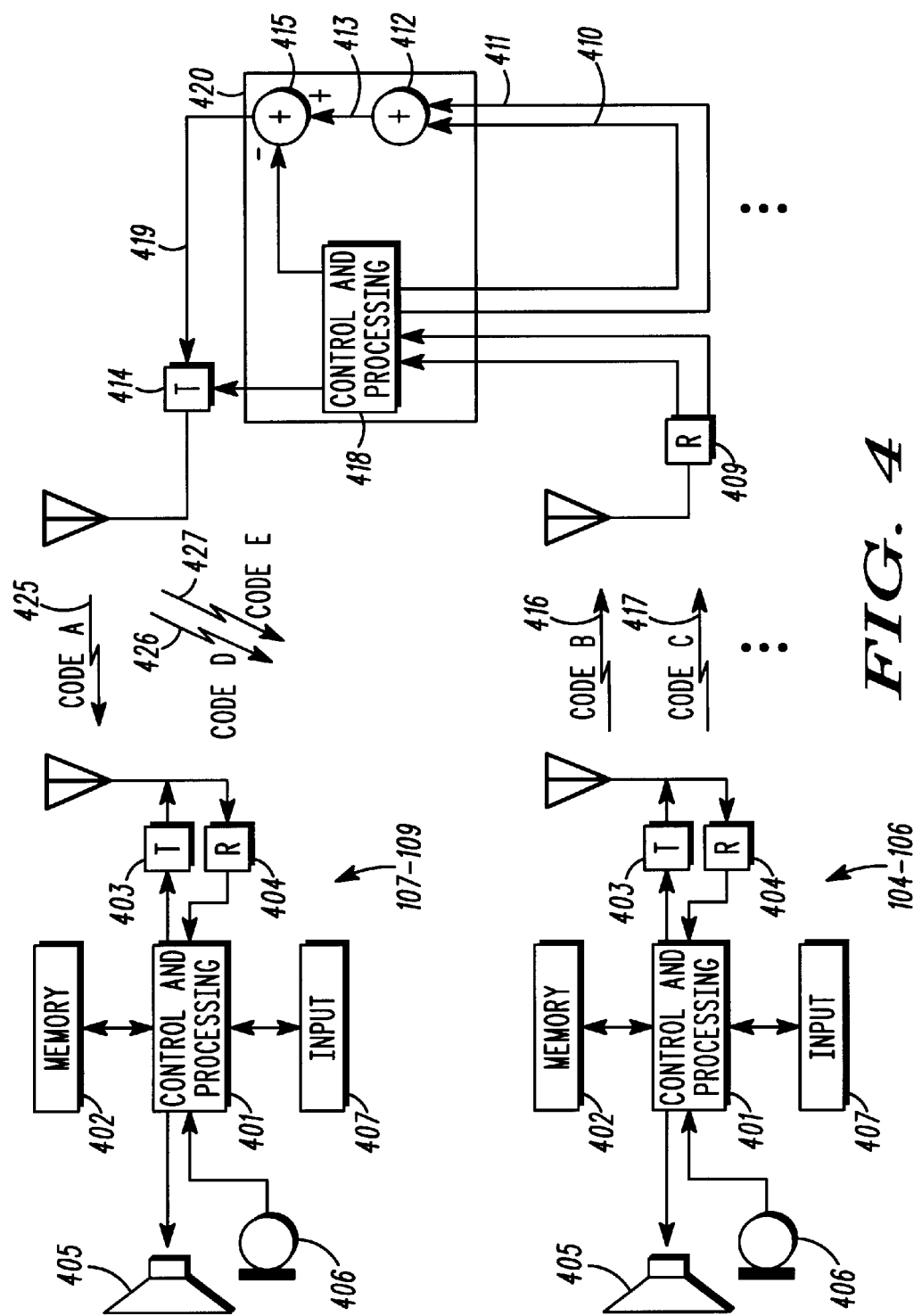
FIG. 4 is a block diagram illustrating operation of the wireless communication system of FIG. 1 in accordance with the present invention.
Figure 5:
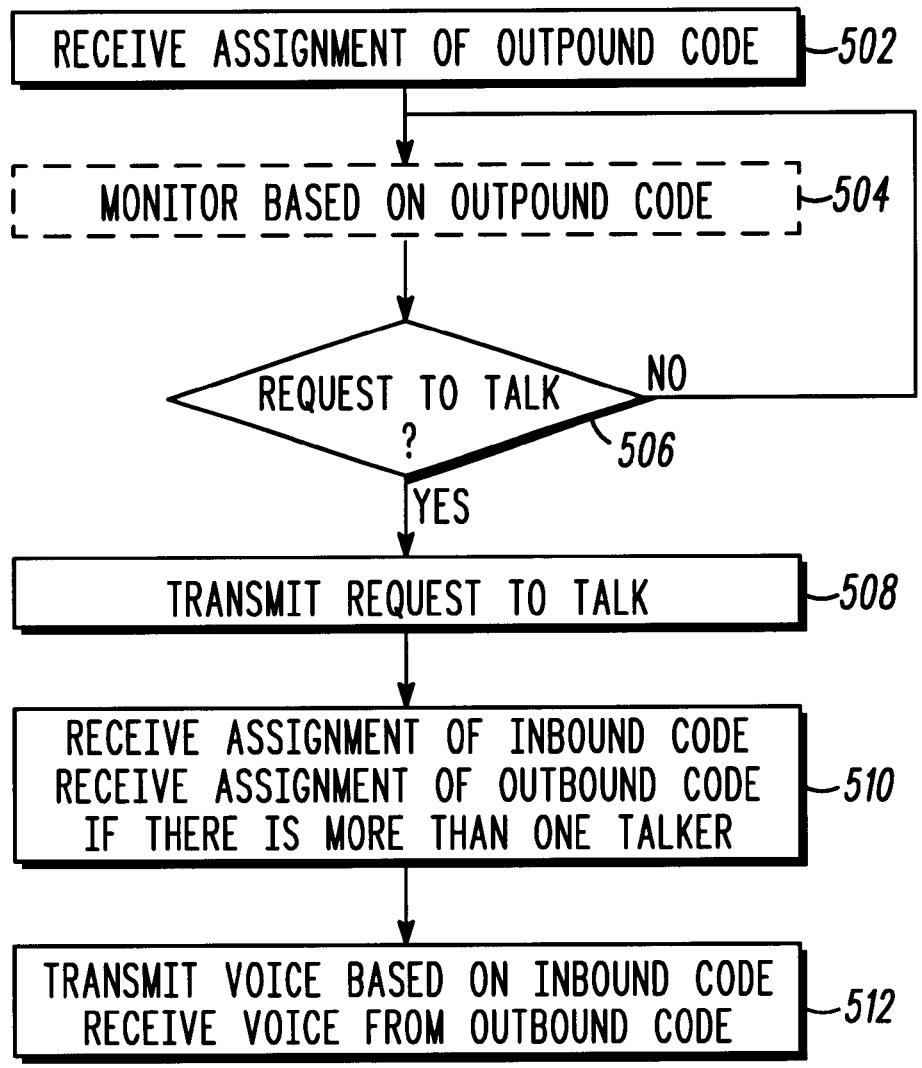
FIG. 5 is a flow chart illustrating a method for use by a subscriber unit in accordance with the present invention.

Operation of the present invention may be further described with reference to FIG. 4. In FIG. 4, fixed infrastructure 103 comprises a receiver 409 that provides separate streams of voice information 410–411 based on transmissions by the members of sub-talkgroup 102, summers 412 and 415 that sums the streams of voice information 410–411, and a transmitter 414 that transmits summed voice information 413 to talkgroup 101 using outbound codes 415 (labeled Code A, D, and E). The transmissions by the members of sub-talkgroup 102 are based on inbound codes 416–417 (labeled "Code B" and "Code C"). In the preferred embodiment of the present invention summers 412 and 415 are part of dispatch controller 114 existing external to base stations 112–113.

As shown in FIG. 4, each of subscriber units 104–109 has a set of common elements. In particular, a control and processing element 401, which typically comprises a one or more processing devices (e.g., microprocessors, digital signal processors, etc.), is coupled to memory 402. Control and processing element 401 is coupled to transmitter 403, receiver 404, speaker 405, microphone 406, and input device 407. Each of these elements is well-known in the art. Under control of software algorithms stored in memory 402, control and processing element 401 performs those tasks required for operation of the subscriber unit. Receiver 404 is used to receive assignments of outbound and/or inbound codes for use in talkgroup calls and, subsequently, to receive de-assignments of the outbound and/or inbound codes. Additionally, in all subscriber units included in talkgroup 101, summed voice information 413, modulated according to outbound codes 415 and received via receiver 404, is processed and provided to speaker 405. In this manner, subscriber units included in talkgroup 101 can monitor the outbound communications corresponding to the talkgroup call. Input device 407, which may comprise a keypad, menu-driven display or similar device, allows users to transmit requests to talk. In duplex subscriber units (i.e., members of sub-talkgroup 102), speech input through microphone 406 is processed and provided as a stream of voice information to transmitter 403 for transmission based on an inbound code 416–417. The duplex subscriber units also make use of a voice-activated switching element (VOX) 408 such that a continuous stream of voice information (when speech is picked up by microphone 406) or an idle pattern (when speech is not picked up by microphone 406) is transmitted.

In the example of FIG. 4, two unique inbound codes, Code B and Code C, are used by subscriber units in sub-talkgroup 102 to transmit streams of voice information 410–411. In practice, the inbound codes, Code B and/or Code C, are used not only to transmit inbound voice information, but may also be used to transmit power control information such that fixed infrastructure 103 knows the status of the outbound code. That is, fixed infrastructure 103 may adjust outbound transmitted power relative to outbound codes in order to maintain communications. Additionally, several outbound codes 425–427 (Codes A, D and E) are used to transmit the resulting summed voice information. In practice, the outbound codes are used not only to transmit summed voice information 413, but may also be used to transmit control information, such as inbound code assignments and power control information, to members of sub-talkgroup 102.

As described above, multiple subscriber units that are members of sub-talkgroup 102 may transmit simultaneous voices to fixed infrastructure 103. In the preferred embodiment of the present invention the voice signals are received by receiver 404 and passed to processor 418. Processor 418 may pass all codes to summer 412, however when an EVRC vocoder is utilized, only the two highest-energy voice signals are passed from processor 418 to be summed at summer 412. The resulting summed voice then passes to second summer 415 where an individual voice signal is removed from summed signal 413. In the preferred embodiment of the present invention control and processing unit 418 passes an individual voice signal to summer 415 so that it is removed from summed signal 413 even if the individual voice signal has the highest voice energy. The individual voice signal passed to summer 415 is determined by where resulting signal 419 is being sent. For example, if signal utilizing a particular code (Code D) is being transmitted to subscriber 104, then the voice signal from subscriber 104 is passed to summer 415 and removed from signal 413. The resulting signal (signal 419) is then spread with a particular code (Code D) and transmitted to subscriber 104. The result is a received signal at subscriber 104 that is a combined signal of all simultaneous talkers (or the two highest) without sending out signal from the inbound channel of subscriber 104.

Thus, in accordance with the preferred embodiment of the present invention, a particular talker in subgroup 102 receives an outbound signal comprising the combined voice of all talkers in sub-talkgroup 102, however, the voice from the particular talker is removed from the outbound signal. Those units 107–109 in the sub-listengroup will receive a combined signal of all talkers, with no voice being removed from signal 413. This is accomplished by processing unit 418 passing no signal to summer 415 when a transmission to units 107–109 is desired.

As described above, a subscriber unit in the sub-listengroup may transmit a request to talk to fixed infrastructure 103 in order to participate in the talkgroup call. Operation of a subscriber unit to this end is further illustrated in FIG. 5. At step 502, a subscriber unit receives an assignment of an outbound code relative to a talkgroup call. As described above, such assignment is typically transmitted over a control access channel established through the use of a known code.

At step 504, the subscriber unit may optionally monitor outbound communications relating to the talkgroup call. This step is optional in that a user of the subscriber unit may choose not to monitor the talkgroup call, or outbound communications may not be immediately forthcoming after receipt of the outbound code assignment. Regardless, at step 506, the subscriber unit detects a need to transmit a request to talk, which request is directed to the talkgroup call. After transmitting the request to talk to fixed infrastructure 103 at step 508, the subscriber unit subsequently receives, from fixed infrastructure 103, an assignment of an additional inbound code and an additional outbound code if there are more than one talkers in the sub-talkgroup, at step 510. Having received the assignment, the subscriber unit can begin transmitting an additional stream of voice information using the inbound code and receiving an additional stream of voice information using the outbound code if there are more than one talker at step 512. In this manner, any given subscriber unit may remain a listen-only participant or, if desired, alter its status to become an active participant (i.e., a speaker) in the talkgroup call.

Figure 6:
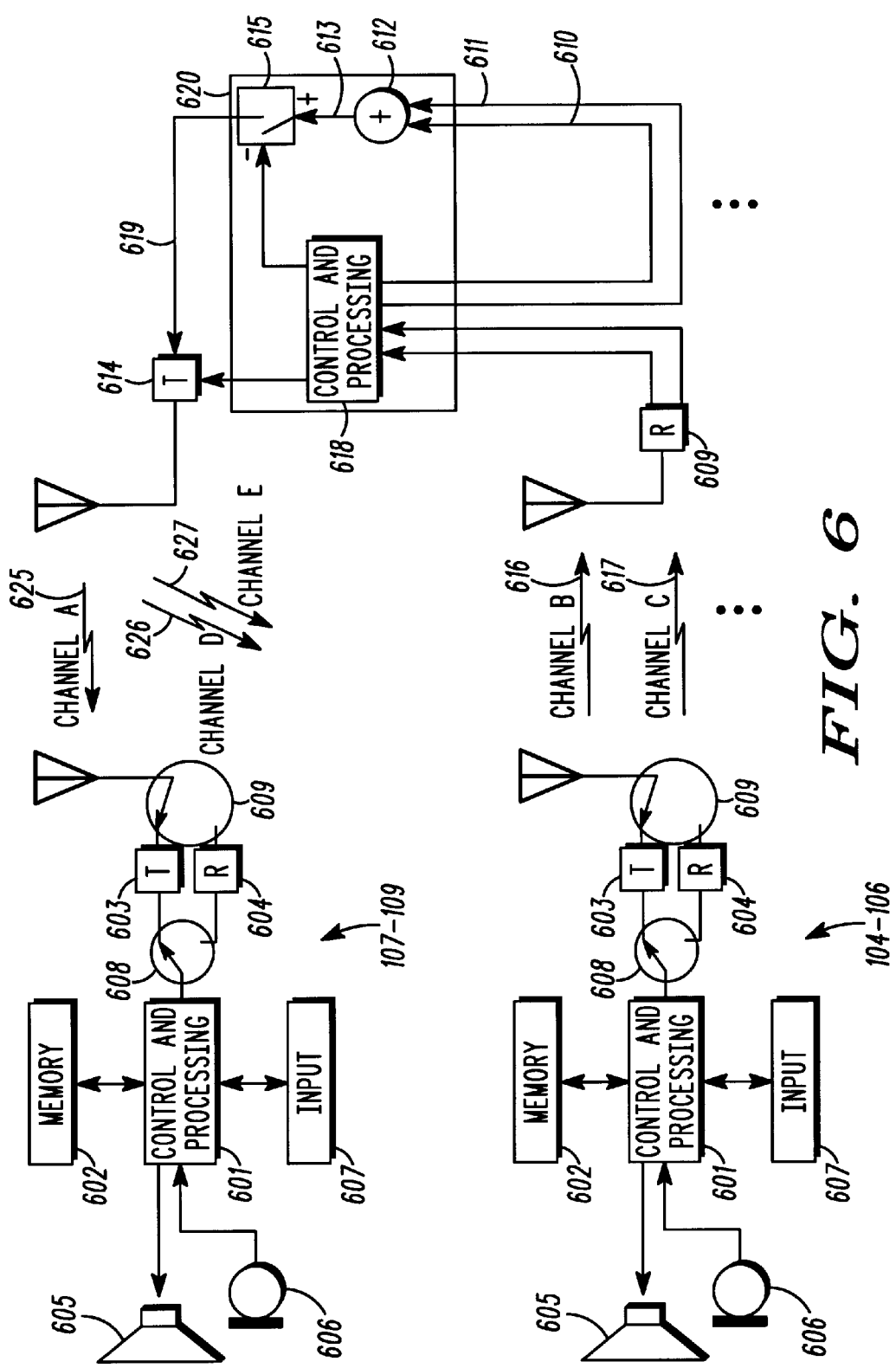
FIG. 6 is a block diagram illustrating operation of the wireless communication system of FIG. 1 in accordance with an alternate embodiment of the present invention.

FIG. 6 is a block diagram illustrating operation of the wireless communication system of FIG. 1 in accordance with an alternate embodiment of the present invention. In the alternate embodiment of the present invention communication system 100 utilizes a Time-Division-Multple-Access (TDMA) system protocol. The alternate embodiment will be described below with communication system 100 that is preferably an iDEN® system commercially available from Motorola, Inc. The base sites 112–113 preferably comprise "iDEN" Enhanced Base Transceiver Sites (EBTSs), which are commercially available from Motorola, Inc., and provide at least dispatch communication services to subscriber units 104–109. Communication units 104–109 preferably comprise two-way radio or radiotelephone devices, such as Motorola "iDEN" mobile or portable radios.

In FIG. 6, fixed infrastructure 103 comprises a receiver 609 that provides separate streams of voice information 610–611 based on transmissions by the members of sub-talkgroup 102, summer 612 that sums the streams of voice information 610–611, switch 615, and a transmitter 614 that transmits summed voice information 613 to talkgroup 101 using outbound channels 615 (labeled Channel A, D, and E). Unlike the preferred embodiment where a CDMA system architecture is used, in the alternate embodiment channels comprise a particular frequency/timeslot combination. The transmissions by the members of sub-talkgroup 102 are based on inbound channels 616–617 (labeled "Channel B" and "Channel C").

As shown in FIG. 6, each of subscriber units 104–109 has a set of common elements. In particular, a control and processing element 601, which typically comprises a one or more processing devices (e.g., microprocessors, digital signal processors, etc.), is coupled to memory 602. Control and processing element 601 is coupled to transmitter 603, receiver 604, speaker 605, microphone 606, input device 607, time divided switches 608 and 609. Each of these elements is well-known in the art. Under control of software algorithms stored in memory 602, control and processing element 601 performs those tasks required for operation of the subscriber unit. Receiver 604 is used to receive assignments of outbound and/or inbound channels for use in talkgroup calls and, subsequently, to receive de-assignments of the outbound and/or inbound channels. Additionally, in all subscriber units included in talkgroup 101, summed voice information 613, modulated according to outbound channels 615 and received via receiver 604, is processed and provided to speaker 605. In this manner, subscriber units included in talkgroup 101 can monitor the outbound communications corresponding to the talkgroup call. Input device 607, which may comprise a keypad, menu-driven display or similar device, allows users to transmit requests to talk. In duplex subscriber units (i.e., members of sub-talkgroup 102), speech input through microphone 606 is processed and provided as a stream of voice information to transmitter 603 for transmission based on an inbound channel 616–617. The duplex subscriber units also make use of a voice-activated switching element (VOX) 608 such that a continuous stream of voice information (when speech is picked up by microphone 606) or an idle pattern (when speech is not picked up by microphone 606) is transmitted.

In the example of FIG. 6, two unique inbound channels, Channel B and Channel C, are used by subscriber units in sub-talkgroup 102 to transmit streams of voice information 610–611. In practice, the inbound channels, Channel B and/or Channel C, are used not only to transmit inbound voice information, but may also be used to transmit power control information such that fixed infrastructure 103 knows the status of the outbound channel. That is, fixed infrastructure 103 may adjust outbound transmitted power relative to outbound channels in order to maintain communications. Additionally, several outbound channels 625–627 (Channels A, D and E) are used to transmit the resulting summed voice information.

As described above, multiple subscriber units that are members of sub-talkgroup 102 may transmit simultaneous voices to fixed infrastructure 103. In the preferred embodiment of the present invention the voice signals are received by receiver 604 and passed to processor 618. Processor 618 may pass all channels to summer 612, however when an EVRC vocoder is utilized, only the two highest-energy voice signals are passed from processor 618 to be summed at summer 612. The resulting summed voice then passes to switch 615 where the summed signal 613 is either passed to transmitter 414 or not based on the current talker and where resulting signal 619 is being sent. For example, if signal utilizing a particular channel (Channel D) is being transmitted to subscriber 104, then the voice signal from subscriber 104 is not passed by switch 615 to transmitter 614. The result is a received signal at subscriber 104 that has no audible component when subscriber 104 is talking.

Thus, in accordance with the preferred embodiment of the present invention, a particular subscriber in subgroup 102 receives an outbound signal comprising the combined voice of all talkers in sub-talkgroup 102, however, when the particular subscriber is talking, switch 615 does not pass combined signal 413, resulting in no audible signal being received by the subscriber. Those units 107–109 in the sub-listengroup will receive a combined signal of all talkers, with switch 615 passing combined signal 613.

Figure 7:
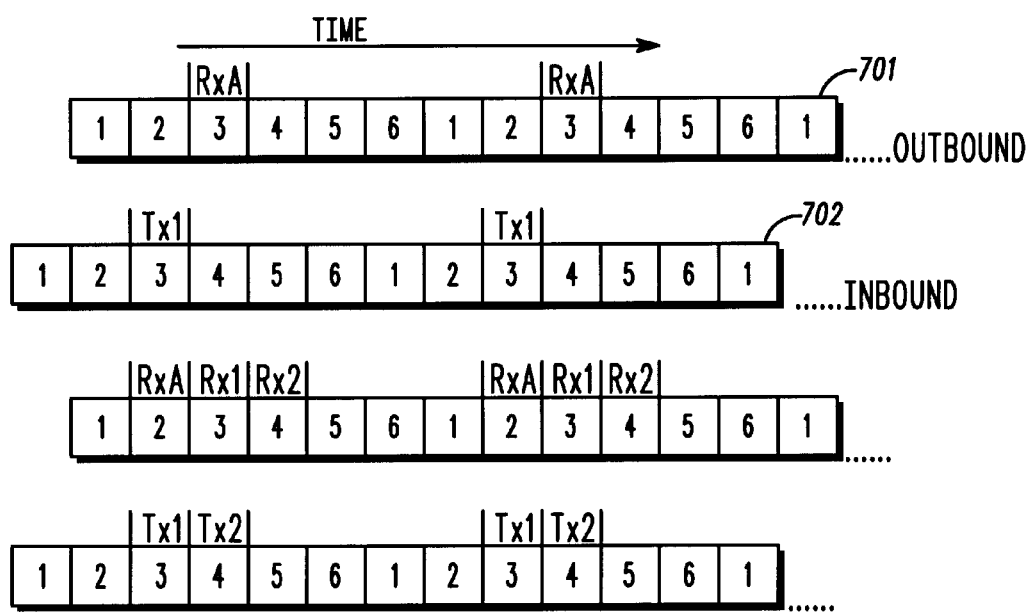
FIG. 7 is the block diagram illustrating the time slot distribution of the TDMA wireless communication system of FIG. 6.

In order to save RF resources, transmission and receiving operations utilize different time slots. For example, with reference to FIG. 7, when an iDEN system makes a call, a mobile inbound frame 702 uses one time (e.g., time slot 3) and its outbound frame 701 uses the same time slot (e.g., time slot 3) as well. In the preferred embodiment of the present invention the outbound time slot (slot 3) in the inbound frame 702 is designed one time slot delay after the inbound time slot (701) (slot 3). Since the inbound and outbound time slots differ in time, the RF duplexers in the mobiles are avoided by using the time switches 608 and 609.

When a mobile makes a 2-master (more than one talker) dispatch phone call, the caller belongs to sub-talkgroup 102 initially (the caller is defined as the first master). The caller is issued use of one of the inbound time slots (e.g., time slot 3) from the fixed infrastructure 103. The outbound time slot (slot 3) with the same inbound slot number of other callees who belong to the sub-listengroup 130 is issued from fixed infrastructure 103 as well. When one of the listeners in the sub-listengroup 130 requires talking and its request is granted from fixed infrastructure 103, the listener is moved from the sub-listengroup 130 to the sub-talkgroup 101. In the preferred embodiment of the present invention one pair of inbound and outbound time slots (e.g., time slot 4) is issued to the new talker (the second talker is defined as the second master). In order to give the first talker (first master) listening capability, the same outbound time slot (slot 3) as the inbound time slot is issued to the first talker (first master). A new outbound time slot (time slot 2) other than the same outbound time slot (time slot 3) has to be issued to the sub-listengroup 130.

If the first talker (first master) stops talking, its inbound and outbound time slots (Tx/Rx time slot 3) are released. The outbound time slot (Rx time slot 4) of the second talker (second master) is released as well. In order to save resources for other calls, the inbound time slot number (Tx time slot number 4) of the second talker is changed to the same outbound time slot number (time slot number 2 here) of the sub-listengroup 130. Then the second talker (second master) is named as the first talker (first master).

If N participants desire to talk, N pair of transmitting and receiving time slots plus one more receiving time slot are required, where N is the member number of the sub-talkgroup 103. In the iDEN system, there are only 6 time slots in a frequency channel. If N is larger than 5, some of the participants in the sub-talkgroup 103 have to relocate to other frequency channels, since one outbound time slot has to be reserved for the sub-listengroup 130.

In the traditional iDEN dispatch group call, there exists a supervision mode. If one participant has the priority of a supervisor, its voice from one inbound time slot to replace the current dispatch talker's voice to be sent to the listeners of the sub-listengroup 130. In present invention, the supervisor's voice and the current talker's voice are summed to the all listeners in the sub-listengroup.

The present invention generally provides a method and apparatus for duplex communications within talkgroups. Through the use of an efficient CDMA or TDMA system resource allocation method, the present invention allows a sub-talkgroup of subscriber units to talk in a wireless duplex conference call while other members, potentially in a very large talkgroup, can listen and, if desired, join the call. In this manner, more natural, group-style communications can be achieved without placing an undue burden on the usage of wireless communication resources.

Although the present invention has been described with reference to certain preferred embodiments, numerous modifications and variations can be made by those skilled in the art without departing from the novel spirit and scope of the present invention. For example, although the preferred embodiment was described above with subtracting an individual user's voice signal from a summed signal, other techniques may be used to construct a summed signal without the individual user's voice. For example, instead of subtracting a subscriber's voice signal at summer 415, in an alternate embodiment, summer 415 is eliminated, and processing unit 418 simply does not pass the subscriber's voice signal to summer 412 when the resulting summed signal is to be sent to the subscriber.

What is claimed is:

1. In a wireless communication system comprising a plurality of subscriber units in wireless communication with a fixed infrastructure, a method for the fixed infrastructure to establish a talkgroup call, the method comprising steps of:

receiving, from a first subscriber unit of the plurality of subscriber units, a request for the talkgroup call, the request comprising an identity of the first subscriber unit and an identity of a talkgroup;

identifying, based on the identity of the talkgroup, a talkgroup of subscriber units comprising at least two subscriber units of the plurality of subscriber units;

identifying, based on the identity of the first subscriber unit, a sub-talkgroup of subscriber units of the talkgroup;

assigning an outbound time slot in a frequency channel to subscribers in the sub-listengroup;

assigning a plurality of outbound time slots in the frequency channel in a one-to-one manner to subscribers in the sub-talkgroup if there is more than one talker; and assigning, in a one-to-one manner, at least one inbound time slot in the frequency channel to the sub-talkgroup.

2. The method of claim 1, the step of identifying the talkgroup further comprising a step of indexing a table according to the identity of the talkgroup to select an entry uniquely associated with the identity of the talkgroup.

3. The method of claim 2, the step of identifying the sub-talkgroup further comprising a step of indexing the entry according to the identity of the first subscriber unit.

4. The method of claim 3, further comprising the step of identifying the sub-talkgroup that comprises stored identities of subscriber units of the talkgroup that have recently engaged in communications with the first subscriber unit.

5. The method of claim 3, further comprising the step of identifying the sub-talkgroup that comprises stored identities of subscriber units of the talkgroup having a priority level at least as high as the first subscriber unit.

6. The method of claim 3, further comprising the step of identifying the sub-talkgroup that comprise stored identities of subscriber units of the talkgroup having locations within a predetermined distance of the first subscriber unit.

7. The method of claim 1, further comprising steps of:
receiving, based on the at least one inbound time slot in a frequency channel, streams of voice information from subscriber units of the sub-talkgroup;
summing the streams of voice information to produce summed voice information; and
transmitting, based on the outbound time slot of a frequency channel, the summed voice information to the talkgroup.

8. The method of claim 5, further comprising a step of de-assigning the outbound time slot of a frequency channel and the at least one inbound time slot of a frequency channel when the talkgroup call has ended.

9. The method of claim 5, further comprising steps of:
receiving, from a second subscriber unit of the sub-listengroup, a request to talk;
assigning an additional inbound time slot in a frequency channel to the second subscriber unit;
receiving, based on the additional inbound time slot in a frequency channel, an additional stream of voice information from the second subscriber unit; and
summing the streams of voice information and the additional stream of voice information to produce the summed voice information.

10. The method of claim 7, further comprising a step of de-assigning the outbound time slot in a frequency channel, the at least one inbound time slot in a frequency channel and the additional inbound time slot in a frequency channel when the talkgroup call has ended.

11. The method of claim 1 further comprising the step of assigning, in a one-to-one manner, the inbound time slot and outbound time slot of a subscriber in the sub-talkgroup are in the different time.

12. In a wireless communication system comprising subscriber units in wireless communication with a fixed infrastructure, a method for the fixed infrastructure to establish a talkgroup call, the method comprising steps of:
receiving inbound voice data from a plurality of subscriber units within a talkgroup, the inbound voice data comprising voice data from a first subscriber;
summing the inbound voice data to produce summed voice data; and
transmitting the summed voice data to subscribers within the talkgroup without transmitting the summed voice data to the first subscriber.

* * * * *